June 2, 1936.  E. STUBBS  2,043,017
FREEHAND GRINDING MACHINE
Filed June 7, 1934
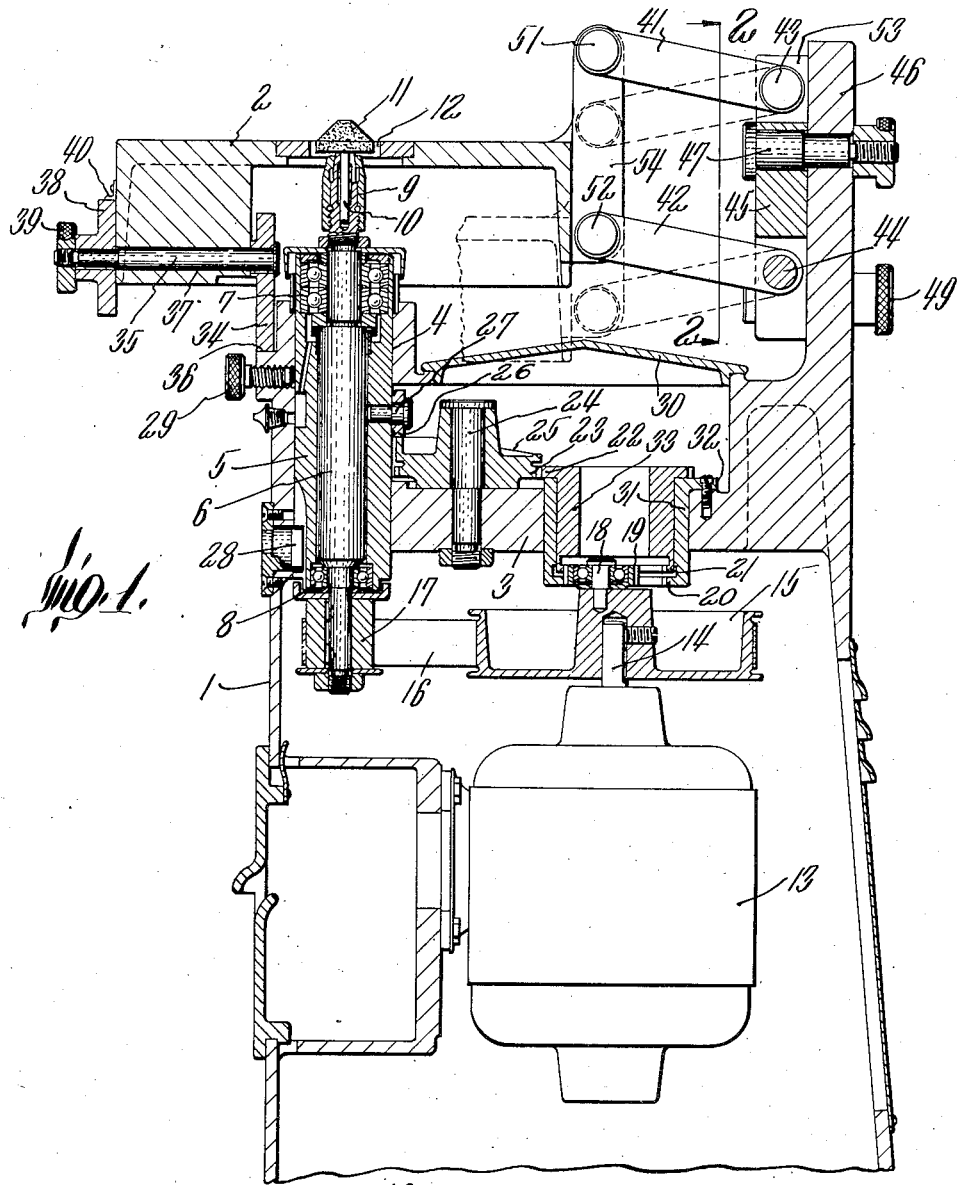
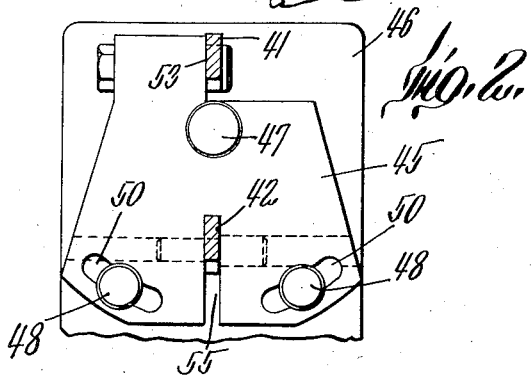
Inventor
Everard Stubbs
by Wright, Brown, Quinby & May
Attys Patented June 2, 1936

2,043,017

UNITED STATES PATENT OFFICE 2,043,017

FREEHAND GRINDING MACHINE

Everard Stubbs, Springfield, Vt.

Application June 7, 1934, Serial No. 729,420

10 Claims. (Cl. 51—34)

The present invention is concerned with machines for performing cutting operations on articles of such small or moderate mass and dimensions that they can be moved, relatively to the tool, by manipulation of an operator, with sufficiently exact control of their movements to accomplish the desired result. One of the operations which such a machine can perform is to bevel or chamfer sharp edges between intersecting surfaces as, for instance, the rim of the hole in a hardened milling cutter, gear shaper cutter, etc., provided to receive the spindle or arbor by which such tools are actuated in the machine tool. The spindle holes in tools of this character are ground with precision to fit the spindle, and the end faces of the tools are ground also, making a sharp intersection with the sides of the hole. It is desirable to cut away this sharp edge, or "break edges" (as it is called in shop parlance), so that the hole can be more easily centered with the spindle and to avoid liability of cutting or scraping the softer metal of the spindle when the tool is applied. The foregoing illustrates, by reference to one specific use, the nature of the purposes which such a machine is adapted to serve.

It has been my object to produce a machine of this type by which the manipulation of the work is facilitated and the cutting effect distributed over the cutting points of the tool; which is capable of adjustment so that the character of the work may be varied; and having novel features and characteristics of construction and arrangement of its various parts whereby a relatively simple and inexpensive, but at the same time highly efficient and practical, machine is produced.

The principles and characteristics of the invention are explained in detail with reference to one embodiment, but with the understanding that various modifications in and departures from this specific illustration may be made within the scope of the protection claimed. The machine chosen for illustration is provided with a grinding wheel as the operating tool, and indeed grinding is the type of cutting for which such machines will be most generally used. For this reason, and because the work is fed to the tool by manipulation rather than by the automatic action of a mechanical work holder, I have designated the machine by the title "Free hand grinding machine". But such title is not intended as a limitation of the invention to grinding as distinguished from other types of cutting, or to the use of an emery wheel or disk to the exclusion of other types of tool, such as edged cutters, laps, burnishers, etc.

In the drawing,—

Fig. 1 is a vertical section of a machine illustrating the principles of the invention in the embodiment and having the details at present preferred by me;

Fig. 2 is a part section taken on line 2—2 of Fig. 1.

The frame structure of the machine comprises a base or pedestal which may be designed either to rest on the floor or to be mounted on a bench, etc., and a table 2 on which the work is supported, located at a height convenient for manipulation by an operator of the work resting thereon. The base is hollow, and includes in its upper part a cross bar or web 3 in which (and also in an alined guideway 4) there is mounted for vertical sliding movement a quill 5 carrying rotatably the tool spindle 6. Said spindle is held, adjacent to opposite ends, by bearings 7 and 8. It is beneath the middle part of the table and its upper end is equipped with a chuck 9 detachably grasping the shank 10 of a grinding wheel 11, which rises more or less above the table through a hole 12 therein. The illustrated grinding wheel is conical with a taper angle of 45°. It may be replaced by grinding wheels of other shapes or by tools other than grinding wheels.

An electric motor 13 for rotating the spindle 6 and reciprocating the quill 5 is mounted in any suitable way within the base. Its armature shaft 14 carries a pulley 15 which drives, by a belt 16, a pulley 17 secured to the spindle.

Pulley 15 carries an eccentric pin 18 on which is rotatably mounted a pinion 19 meshing with a fixed internal gear 20 and a rotatable internal gear 21, both internal gears being coaxial with the pulley, and one of them having one tooth more than the other. This constitutes a differential planetary gear train by which the gear 21 is turned through the angular spacing of one tooth with each complete rotation of the motor shaft 14. It is immaterial which of the two internal gears has the larger number of teeth.

The internal gear 21 is connected with an external gear 22 which meshes with a gear 23 rotatable about a stud 24, fixed in the frame member 3, and carrying a cam 25. The active surface of this cam is offset axially, and exerts endwise thrust on the quill, against the resistance of gravity, through a roll 26 on a stud 27 which protrudes from the side of the quill over the cam. A key 28 fixed in the side of the base projects into a groove in the adjacent side of the quill to prevent rotation of the latter.

The conjoint effect of cam 25 and gravity causes the grinding wheel to rise and descend through the hole in the table, at a slow rate, whereby contact with the work is distributed over its whole area. Thus it is maintained in approximate truth much longer than if its contact with the work were limited to a single line or zone, it requires truing much less frequently, and its useful life is greatly prolonged. The cam may be so formed as to give the tool a continuous movement up and down, or to move it by steps, with intermediate dwells when it is stationary with respect to the table except for its rotational movement. A screw 29 is set into the side of the base for use in clamping the quill at its upper limit of motion away from the influence of the cam if desired, or at any other height possible when the cam is removed. The cam, its pivot stud, and the differential gearing are accessible for inspection, removal and substitution through an opening in the upper part of the base which is normally closed by a removable cover 30.

A novel feature for which I claim protection is embodied in the differential gear assemblage. The internal gear 20 of this assemblage is cut in an internal flange on the lower end of a sleeve or shell 31 which is fitted in a hole passing through the frame member 3 and secured therein by lugs 32 and screws. The interior of sleeve 31 is finished as a bearing for a cylindrical block or tube 33 having an outwardly directed flange on its upper end, overlapping the end of the bearing sleeve 31, in which the teeth of gear 22 are cut, and an inwardly directed toothed flange on its lower end, which forms the gear 21. The outward flange serves as a thrust bearing by which the gear assemblage 21, 22, 33 is supported.

Table 2 is adjustable as to height, and is so adjusted by means of a cam or eccentric 34 fastened to the inner end of a shaft 35 and bearing at its circumference on an abutment 36 on the base. Shaft 35 is contained in a long bearing 37 in the forward side of the table and carries on its protruding end a disk 38 for turning it and a clamp nut 39 for securing it in adjusted position. Disk 38 may be graduated for measuring the extent of such adjustment with reference to a stationary index 40 fixed to the table. Parallel links 41 and 42 pivoted to the frame structure and to the table, one above the other, guide the table in its up and down adjustments and cause all of its positions to be parallel with one another. The attachment of these links with the machine base is made by means of pivots 43 and 44 and a block or plate 45 in which these pivots are seated and which in turn is connected to an upright extension 46 of the base by a pivot 47 and clamp screws 48 having nuts 49. The axis of pivot 47 is horizontal and intersects the axis of tool 11 (being thus perpendicular to the latter axis), and it is also in the same plane with the top surface of the table when the latter is in one of the locations within its range of adjustment, thus permitting the table to be inclined without otherwise changing its relationship to the tool. The clamp screws 48 pass through slots 50 in the plate 45, concentric with pivot 47. The links are prevented from tipping or deflecting sidewise by being made of substantial width and being held by the heads of their pivot studs 43, 51, and 52 against respectively a flat surface 53 on plate 45 and a flat lateral surface on a web 54 on the table. The outer end of link 42 is confined in a slot 55 in plate 45, as shown in Fig. 2 for the same purpose. Indeed the web 54 may be made double, or slotted if desired, so as similarly to flank and embrace the inner ends of either or both links.

In the use of this machine, a tool suitable for the purpose in view is mounted in the work spindle. The work piece is placed on the table and, being grasped in the operator's hand, is moved up to and past or around the tool until all of the edge or corner, or other part, to be cut has been brought into contact with the tool. If the operation is that of beveling the edge of the hole in a hardened metal cutting tool, the tool to be finished is placed on the table with its hole embracing a small conical grinding wheel, and is moved with a rapid circular motion of the hand such that the entire circuit of this edge is wiped across the tool, one or more times.

What I claim and desire to secure by Letters Patent is:

1. In a machine of the character set forth, an endwise movable quill, a tool spindle carried by said quill and rotatable therein, a rotatable driving element, transmission gearing between said driving element and spindle for rotating the latter, a pivot carried by said driving element eccentrically thereof, a pinion rotatably mounted on said pivot, stationary and rotatable internal gears coaxial with the driving element, both meshing with said pinion, a cam in driven connection with said rotatable internal gear, and an abutment on the quill in thrust receiving engagement with said cam whereby the quill is moved endwise.

2. In a machine of the character described, an endwise movable spindle carrier, a tool spindle rotatable in said carrier on an axis extending in the direction of movement thereof, a driving motor, a direct rotative drive from the motor to the spindle, a cam organized to apply endwise thrust to the spindle carrier, coaxial gears having respectively different numbers of teeth, one of which is rotatable and arranged to impart rotation to the cam, while the other is stationary, and a gear driven by the motor in mesh at the same time with both said coaxial gears.

3. A machine of the character described, comprising a supporting structure, a sleeve mounted in said structure having an internal gear element on one end and an internal cylindrical bearing surface coaxial with said gear element on the other end, a gear unit rotatably mounted in said bearing surface having an internal gear element adjacent to the first named internal gear element, and an external gear element overlapping the opposite end of said sleeve, a driving member coaxial with said internal gear elements, an eccentric pin carried by said driving element, a gear pinion rotatably mounted on said pin in mesh with both internal gear elements, a cam in driven geared connection with said external gear element, a reciprocative spindle carrier in abutting engagement with said cam to be moved endwise by rotation of the latter, and a tool carried by said carrier.

4. A machine tool comprising a base structure, an upright tool spindle mounted rotatably on said structure, a table having a top work-supporting surface crossing the axis of said spindle, a cam interacting between the table and base structure for raising and lowering the table, and parallel links connected pivotally to the table and base structure so as to prevent tilting of the table while permitting such raising and lowering thereof.

5. A machine tool comprising a base structure, an upright tool spindle mounted rotatably on said structure, a table having a top work-supporting surface crossing the axis of said spindle, a cam interacting between the table and base structure for raising and lowering the table, and links of equal length pivoted to the table on substantially horizontal pivot axes at points vertically separated from one another, and similarly pivoted to the base structure at points equally separated from one another in an alinement parallel to that of the first named pivot axes.

6. A machine tool comprising a base structure, an upright tool spindle mounted rotatably on said structure, a table having a top work-supporting surface crossing the axis of said spindle, a cam interacting between the table and base structure for raising and lowering the table, a plate pivotally connected to the base structure at one side of the table to turn about an axis transverse to the up and down movement of the table, and links, one above the other pivoted to said plate and to the table on axes transverse to both said table movement and the first axis, the pivot connections of the links with the plate and the table respectively being equally separated in parallel lines.

7. A finish cutting machine comprising a supporting structure, a tool spindle mounted rotatably on said supporting structure, a table having a work supporting surface in a plane intersecting the axis of said spindle, a pivot mounted on the supporting structure at one side of the work table with its axis intersecting the axis of the tool spindle, and connecting means between said pivot and the work table adjustable angularly about the axis of the pivot, whereby said work supporting surface may be set at various inclinations to the spindle axis, said connecting means being constructed to permit adjustment of the table bodily in directions perpendicular to said pivot axis.

8. A machine tool comprising a supporting structure, a tool spindle mounted on said structure, a table having a work supporting surface in a plane intersecting the axis of said spindle, a plate pivoted to the supporting structure on an axis transverse to that of the spindle, links pivoted to said plate on parallel axes spaced apart from one another in a line transverse to the before named pivot, said links being pivoted to the table at points spaced apart from one another equally to the spacing of their connections with the plate and in parallel alinement therewith, and adjusting means reacting between the table and supporting structure organized to displace the table in the directions permitted by said links.

9. A machine tool comprising a supporting structure, a tool spindle mounted to rotate on said structure, a table having a work supporting surface intersecting the axis of said spindle, parallel links pivoted respectively to the table and supporting structure at points so situated that the axes of their pivots form the corners of a parallelogram transverse to the supporting surface of the table, and adjusting means reacting between the table and supporting structure in directions parallel to the plane of such parallelogram.

10. In a machine of the character described, the combination with a base structure and a work support, of a rotatably mounted tool spindle, a holder for said spindle movable in the base structure lengthwise of the spindle and being restrained from rotation, a cam arranged to act on said holder for moving it endwise, a motor, rotation-transmitting connections from said motor to the spindle, and means for driving said cam at a relatively slow rate comprising coaxial gears having respectively different numbers of teeth, one of which is organized to rotate the cam while the other is withheld from rotation, and a planet gear in mesh with both of said coaxial gears at the same time and driven by said motor in an orbit concentric with said axis.

EVERARD STUBBS.